US012697742B2

(12) United States Patent
Winters

(10) Patent No.: US 12,697,742 B2
(45) Date of Patent: Aug. 4, 2026

(54) FOLDING KNIFE WITH LOCKING MECHANISM

(71) Applicant: Bryan Winters, Lakeville, MN (US)

(72) Inventor: Bryan Winters, Lakeville, MN (US)

( * ) Notice: Subject to any disclaimer, the term of this patent is extended or adjusted under 35 U.S.C. 154(b) by 97 days.

(21) Appl. No.: 18/896,791

(22) Filed: Sep. 25, 2024

(65) Prior Publication Data

US 2026/0084327 A1 Mar. 26, 2026

(51) Int. Cl.
*B26B 1/10* (2006.01)
*B26B 1/04* (2006.01)

(52) U.S. Cl.
CPC . *B26B 1/10* (2013.01); *B26B 1/04* (2013.01)

(58) Field of Classification Search
USPC .............................................................. 30/152
See application file for complete search history.

(56) References Cited

U.S. PATENT DOCUMENTS 338,251 A * 3/1886 Crandall et al. ........ B26B 1/046 30/161
4,612,706 A * 9/1986 Yunes ....................... B26B 1/04 30/160
7,578,064 B2 8/2009 Busse
9,289,904 B2 3/2016 Hawk et al.
10,081,112 B2 9/2018 Langenwalter et al.
2006/0174490 A1 * 8/2006 Galyean .................... B26B 1/04 30/155
2006/0248727 A1 11/2006 Kain
2007/0193036 A1 8/2007 Carlson
2014/0245616 A1 * 9/2014 Onion ....................... B26B 5/00 29/434
2025/0100124 A1 * 3/2025 Huang ..................... B25G 1/10

OTHER PUBLICATIONS

Price, Knife Mechanisms just for the fun of it, 2011, 39pp.

* cited by examiner

*Primary Examiner* — Hwei-Siu C Payer
(74) *Attorney, Agent, or Firm* — Hauptman Ham LLP

(57) ABSTRACT

A folding knife includes a blade, the blade including a stud and a notch on a top portion of the blade. The folding knife also includes an outer handle including an interior side and a first pivot securing the blade to the outer handle, and the blade is configured to rotate about first pivot. The folding knife also includes a liner/inner handle which is configured to rotate about a second pivot forwardly out of the outer handle to engage the stud. The folding knife also includes a detent mechanism which is configured to releasably retain the blade in a closed/undeployed position and the liner/inner handle.

20 Claims, 3 Drawing Sheets

FOLDING KNIFE WITH LOCKING MECHANISM

FIELD

The present disclosure relates to a folding knife with locking mechanism and method of using thereof.

BACKGROUND

Knives with two handles are sometimes referred to as butterfly or balisong knives. These types of knives are difficult to operate because a user has to employ careful manipulation in the opening/closing of the knife because the blade rotates 360 degrees. For example, a user has to be able to move their hand out of the way during opening/closing of the knife to avoid injury, or flip a handle out of the way to the opposite side. These types of knives are not able to be opened and closed like traditional folding knives via some sort of lock tab, switch, plate, button, or other actuator to release the blade because one of the handles has to be swung back around to close the blade. These types of knives also have to be latched or fastened in some manner at the bottom of the handles to keep them from swinging apart, or the handles have to be held together.

SUMMARY

A folding knife includes a blade, the blade including a stud and a notch on a top portion of the blade. The folding knife also includes an outer handle including an interior side and a first pivot securing the blade to the outer handle, and the blade is configured to rotate about first pivot. The folding knife also includes a liner/inner handle which is configured to rotate about a second pivot forwardly out of the outer handle to engage the stud. The folding knife also includes a detent mechanism which is configured to releasably retain the blade in a closed/undeployed position and the liner/inner handle.

BRIEF DESCRIPTION OF DRAWINGS

The disclosure is described in more detail below on the basis of drawings. In the drawings.

DETAILED DISCLOSURE

Figure 1A:
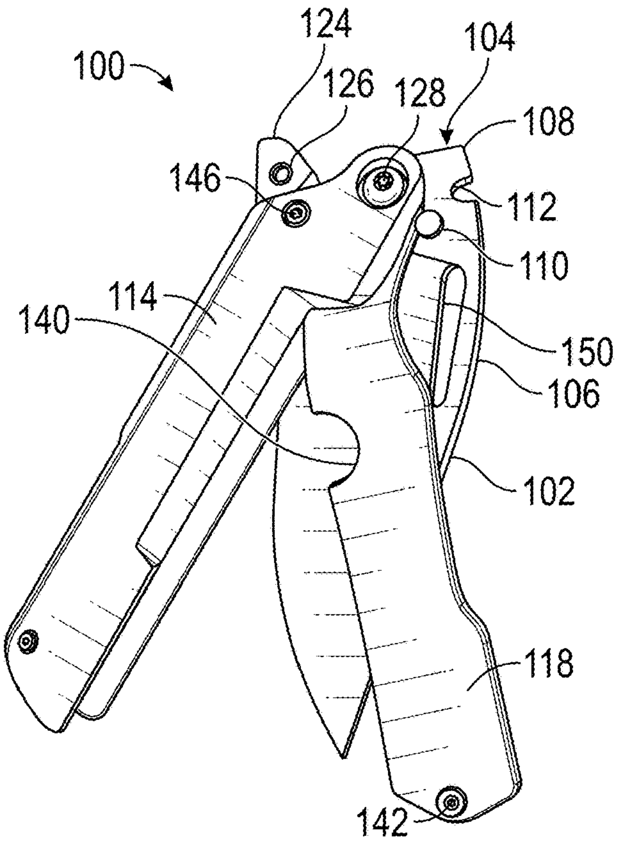
FIG. 1A is a view of a folding knife while being deployed into an open position according to at least one embodiment.
Figure 1B:
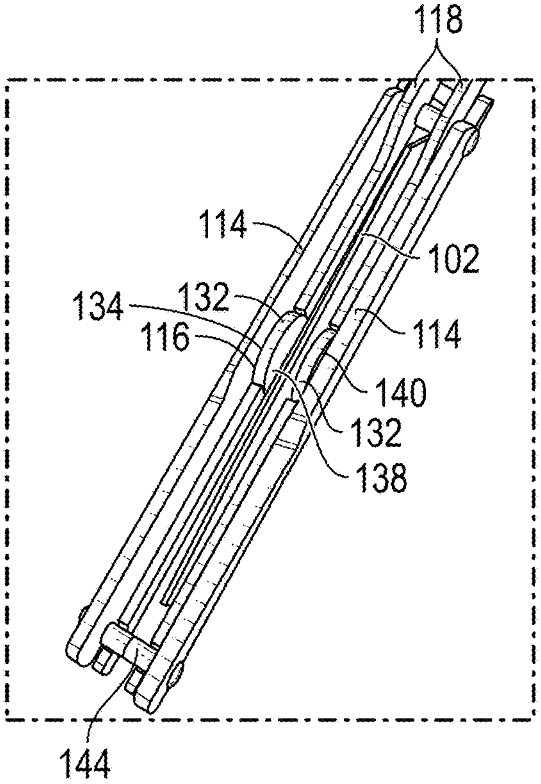
FIG. 1B is a view of a folding knife from the sharp side of the blade in the undeployed position according to at least one embodiment.
Figure 1C:
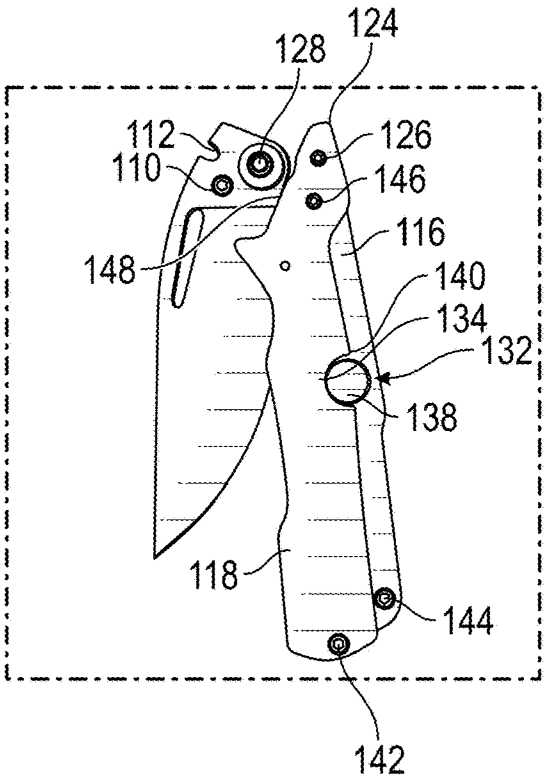
FIG. 1C is a view of a folding knife focused on the liner/inner handle in the undeployed position according to at least one embodiment.

The following detailed description of example embodiments refers to the accompanying drawings. The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment).

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]", "[A] and/or [B]", or "at least one of [A] or [B]" are to be understood as including only A, only B, or both A and B. The foregoing disclosure provides illustration and description but is not intended to be exhaustive or to limit the implementations to the precise form disclosed. Modifications and variations are possible in light of the above disclosure or may be acquired from practice of the implementations.

The present disclosure discloses a new type of locking mechanism for folding pocket knives, having little to no lock failure, even under hard-use conditions. The present disclosure provides for a tight locking mechanism, and eliminates the possibility of vertical blade play which is a common issue with traditional locks. Additionally, the present disclosure overcomes the challenge of lock stick, providing smooth and reliable locking action. The present disclosure also simplifies the manufacturing process by avoiding the need for extremely critical angles and tolerances. The present disclosure also supports various methods of blade deployment and closure, enhancing a user's experience. Overall, the present disclosure retains all of the advantages of traditional folding pocket knives while eliminating typical drawbacks, significantly enhancing reliability, ease of use, and production efficiency.

In FIG. 1A, is a view of a folding knife in the process of being deployed into an open position 100. A blade 102 made of a steel alloy includes a base portion 104, a top portion 106, a tang 108, a stud 110, and a notch 112. The base portion 104 is part of the tang 108, and the base portion 104 is adjacent to the top portion 106.

The top portion 106 includes the notch 112, and the notch 112 is between the stud 110 and the base portion 104 along a length of the blade 102. In at least one embodiment, the notch 112 is circular. In at least one embodiment, the notch 112 is angular, e.g., triangular, rectangular. In at least one embodiment, a cutout/window 150 in the blade 102 is near the top portion 106 and is able to be utilized as another means for deploying the blade 102.

An outer handle 114 is an elongated portion of the folding knife and is the most exterior portion of the folding knife which houses a liner/inner handle 118 and the blade 102. The outer handle 114 includes an outer side (not numbered) and an interior side 116 which opposes the outer side (see FIG. 1B-FIG. 1D and FIG. 1F). The outer handle 114 is able to be made from a variety of materials, e.g., G10 fiberglass, plastics, composites, micarta, metal alloys, e.g., aluminum, titanium, other alloy, or other material not limited to the above. In at least one embodiment, the outer handle 114 has a grip pattern, e.g., diamond pattern, gnarled pattern, so a user is able to better grip the pocket knife. In at least one embodiment, the outer handle 114 has contouring so a user's fingers are able to better grip the pocket knife.

The liner/inner handle 118 is an elongated portion of the folding knife which is recessed beneath the outer handle 114, and the liner/inner handle 118 is rotatably fixed to the outer handle 114 via liner/inner handle pivot/stop pin 146 (also referred to as a second pivot). The second pivot spans the liner/inner handle and the outer handle. In at least one embodiment, the liner/inner handle 118 includes two pieces which are spaced apart and parallel to each other. The two pieces are able to be joined/fixed by a fixing device 142 (see FIG. 1C-FIG. 1F), e.g., via screw(s), together at opposite ends near a top portion and a bottom portion of the outer handle 114 forming an aperture/space through which the blade 102 is able to pivot. In at least one embodiment, the opposite ends near the top portion are able to be joined/fixed by a lock peg 126 and/or the liner/inner handle pivot/stop pin 146, the lock peg 126 being positioned above the liner/inner handle pivot/stop pin 146 near the top portion. In at least one embodiment, the liner/inner handle 118 is an integrally formed, monolithic component.

The liner/inner handle 118 has a cutout 140 (see FIG. 1A-FIG. 1E) which is shaped in such a way as to accommodate a magnet 132 fixed via a bottom portion to the interior side 116 of the outer handle 114. In at least one embodiment, the cutout 140 is semicircular and is in a middle region of the liner/inner handle 118, and/or the magnet 132 has a rounded shape, e.g., a circular shape. Other shapes are within the scopes of various embodiments. The liner/inner handle 118 has a deployment/unlocking tab 124 to which a downward force is applied to deploy the blade. The deployment/unlocking tab 124 is a substantially triangular-shaped portion, and the lock peg 126 and the liner/inner handle pivot/stop pin 146 are fixed between the two pieces of the liner/inner handle 118 at a region of the triangular-shaped portions. In at least one embodiment, the liner/inner handle 118 is made of a ferrous material so as to be magnetically attracted to the magnet 132.

In at least one embodiment, e.g., as shown in FIG. 1A, the deployment/unlocking tab 124 extends from beneath the outer handle 114 so as to be exposed and accessible by a user. In at least one embodiment, the triangular-shaped portions of the deployment/unlocking tab 124 include a side 148 closer to a pivot pin 128, the side 148 being substantially straight and shaped in such a way so the liner/inner wall 118, during rotation about the liner/inner handle pivot/stop pin 146 to engage the stud 110, is not occluded by the pivot pin 128 (also referred to as a first pivot) (see FIG. 1C). The blade 102 is rotatably fixed to the outer handle 114 via the pivot pin 128.

Figure 1D:
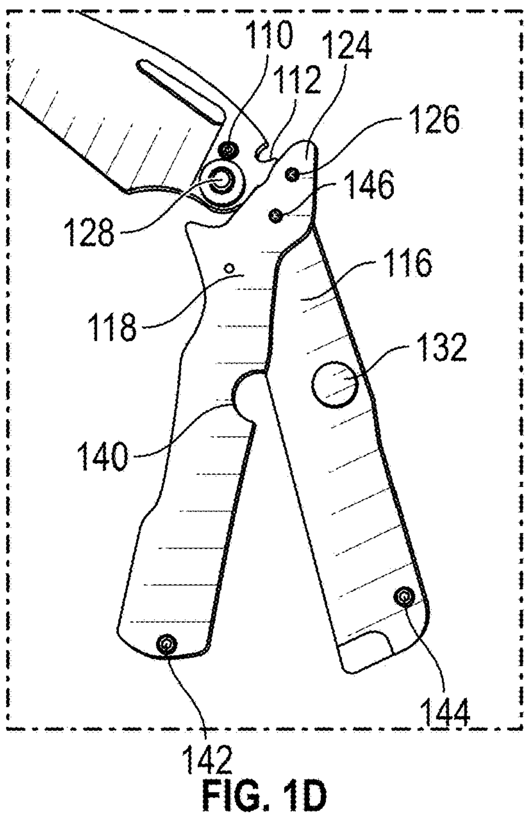
FIG. 1D is a view of a folding knife focused on the liner/inner handle in the deployed position according to at least one embodiment.

In response to a force being applied, by a user, to the deployment/unlocking tab 124 in the state shown in FIG. 1A and FIG. 1D, the liner/inner handle 118 rotates about the liner/inner handle pivot/stop pin 146 until the side 148 of the liner/inner handle 118 comes in contact/engages with the stud 110 on the tang 108 of the blade 102, e.g., as shown in FIG. 1A, and then the rotation of the liner/inner handle 118 causes a forward force deploying/"kicking-out" the blade 102 to a deployed position, the blade 102 rotating about the pivot pin 128. The liner/inner handle 118, while rotating forwardly, forms an X-shape with respect to the outer handle 114 before rotating rearwardly back into the outer handle 114, e.g., as shown in FIG. 1D.

In at least one embodiment, the stud 110 is on a first side of the blade 102. In at least one embodiment, the stud 110 is on a second side of the blade 102. In at least one embodiment, the stud 110 includes two studs, a first stud on the first side of the blade 102 and a second stud on the second side of the blade 102. In at least one embodiment, the stud 110 is fixed to the blade 102 via screw/adhesive. In at least one embodiment, the stud 110 is a magnet and is detachably attached to the blade 102 via magnetic attraction.

In applying the force to the deployment/unlocking tab 124, both the liner/inner handle 118 and the blade 102 are able to overcome the magnetic attraction caused by the magnet(s)/the detent mechanism 132. The blade 102 is able to overcome the magnetic attraction at a portion of the blade 102 which is magnetically detained by a top flat portion 138 of the magnet(s)/the detent mechanism 132 (see FIG. 1A, FIG. 1B, FIG. 1C, FIG. 1D, and FIG. 1F). The liner/inner handle 118 is able to overcome the magnetic attraction at the cutout 140 which is releasably, e.g., magnetically, detained by a side portion 134 of the magnet(s)/the detent mechanism 132. In at least one embodiment, the detent mechanism or locking mechanism is able to be of a type other than one utilizing magnets, for example, a latch-type locking mechanism.

The liner/inner handle 118 is able to rotate forwardly out of the outer handle 114 about the liner/inner handle pivot/stop pin 146 by approximately 30 degrees relative to the outer handle 114, or until the liner/inner handle contacts/engages the stud 110. Conversely, the liner/inner handle 118 does not rotate rearwardly out of the back side of the outer handle 114. After the liner/inner handle 118 contacts the stud 110 "kicking-out" the blade 102 the liner/inner handle 118 "falls back" into the outer handle 114 due to the magnetic attraction of the magnet(s)/the detent mechanism 132 and by force of gravity, the liner/inner handle 118 then being held/detained by the magnet(s)/the detent mechanism 132. A standoff 144 at the bottom portion of the interior side 116 also stops the liner/inner handle 118 from rotating rearwardly past a certain point, i.e., the standoff 144, by occluding a bottom portion of the liner/inner handle 118.

Figure 1E:
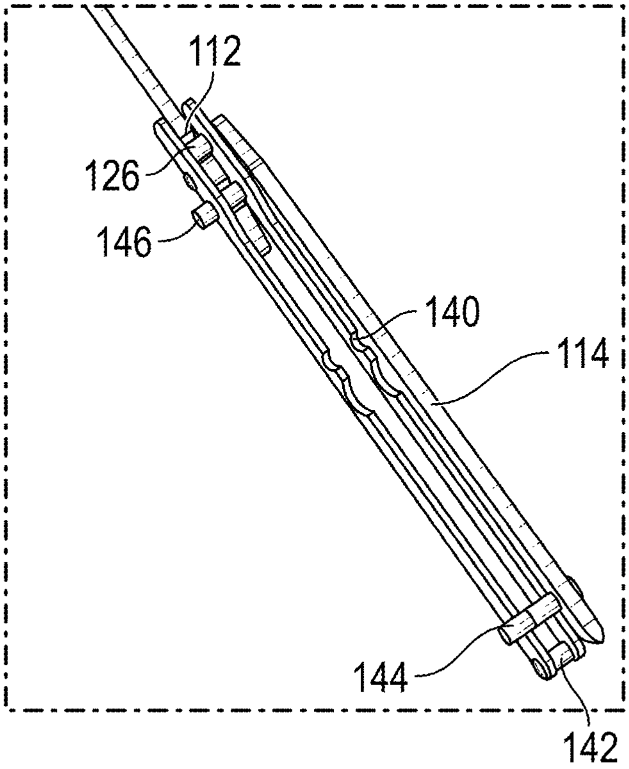
FIG. 1E is a view of a folding knife in the deployed position focused on the lock peg and the stop/pivot pin according to at least one embodiment.
Figure 1F:
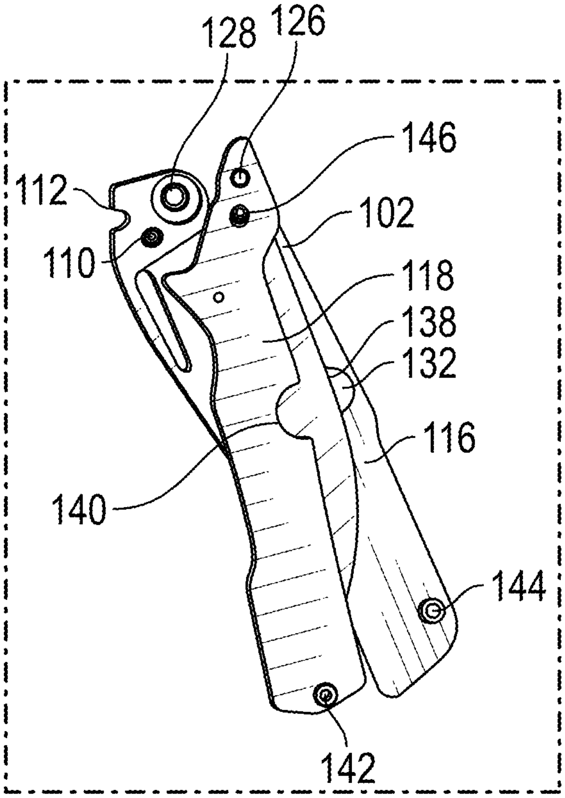
FIG. 1F is a view of a folding knife focused on the liner/inner handle and the blade in the undeployed position according to at least one embodiment.

As the blade 102 rotates to the deployed position and the liner/inner handle 118 rotates, via gravity and magnetic attraction to the magnet(s)/the detent mechanism 132, back into the outer handle 114, the lock peg 126 interlocks/interfaces with the notch 112, e.g., as shown in FIG. 1E, so the blade 102 is securely locked into place with the notch 112 and against the liner/inner handle pivot/stop pin 146. The configuration is such that the tighter a user squeezes the outer handle 114 and the liner/inner handle 118 the more securely locked the blade 102 becomes in a fully deployed state, e.g., as shown in FIG. 1E.

Supplemental Note 1

A folding knife includes a blade, the blade including a stud and a notch on a top portion of the blade. The folding knife also includes an outer handle including an interior side and a first pivot securing the blade to the outer handle, and the blade is configured to rotate about first pivot. The folding knife also includes a liner/inner handle which is configured to rotate about a second pivot forwardly out of the outer handle to engage the stud. The folding knife also includes a detent mechanism which is configured to releasably retain the blade in a closed/undeployed position and the liner/inner handle.

Supplemental Note 2

The folding knife according to Supplemental Note 1, wherein the liner/inner handle is configured to rotate forwardly by approximately 30 degrees out of the outer handle.

Supplemental Note 3

The folding knife according to Supplemental Note 1 or 2, wherein the liner/inner handle is configured to apply force to the stud of the blade to deploy the blade from the closed/undeployed position to an open/deployed position.

Supplemental Note 4

The folding knife according to Supplemental Notes 1-3, wherein the liner/inner handle includes a deployment/unlocking tab at a top portion of the liner/inner handle, a lock peg, and the second pivot.

Supplemental Note 5

The folding knife according to Supplemental Notes 1-4, wherein the lock peg is configured to interface with the notch of the blade in an open/deployed position.

Supplemental Note 6

The folding knife according to Supplemental Notes 1-5, wherein the second pivot spans the liner/inner handle and the outer handle.

Supplemental Note 7

The folding knife according to Supplemental Notes 1-6, wherein the second pivot is configured to interface with a base portion of the blade in an open/deployed position.

Supplemental Note 8

The folding knife according to Supplemental Notes 1-7, wherein the detent mechanism includes a magnet on the interior side of the outer handle.

Supplemental Note 9

The folding knife according to Supplemental Notes 1-8, wherein the liner/inner handle includes two liners which interface with the magnet, the two liners including steel.

Supplemental Note 10

The folding knife according to Supplemental Notes 1-9, wherein the magnet includes two magnets opposing each other which correspondingly interface with two liners of the liner/inner handle.

Supplemental Note 11

The folding knife according to Supplemental Notes 1-10, wherein the magnet includes a side portion, a bottom portion, and a top flat portion.

Supplemental Note 12

The folding knife according to Supplemental Notes 1-11, wherein the side portion and the top flat portion interface with the liner/inner handle and the blade, respectively.

Supplemental Note 13

The folding knife according to Supplemental Notes 1-12, wherein the bottom portion is fixed to the interior side of the outer handle.

Supplemental Note 14

The folding knife according to Supplemental Notes 1-13, wherein the liner/inner handle includes a cutout accommodating a side portion of the magnet so that the side portion of the magnet is able to have unobstructed magnetic attraction to the liner/inner handle, and a top flat portion of the magnet is able to have unobstructed magnetic attraction with the blade.

Supplemental Note 15

The folding knife according to Supplemental Notes 1-14, wherein the cutout is located approximately in a middle region of the liner/inner handle.

Supplemental Note 16

A method of operating a folding knife, the folding knife including a blade which includes a stud, and a notch on a top portion of the blade. The folding knife also includes an outer handle including an interior side and a first pivot securing the blade to the outer handle, and the blade is configured to rotate about the first pivot. The folding knife also includes a liner/inner handle configured to rotate about a second pivot forwardly out of the outer handle to engage the stud. The folding knife also includes a detent mechanism configured to releasably retain (i) the blade in a closed/undeployed position and (ii) the liner/inner handle, wherein the liner/inner handle includes a deployment/unlocking tab at a top portion of the liner/inner handle, a lock peg, and the second pivot. The method includes applying a downward force to the deployment/unlocking tab rotating the liner/inner handle in a forward direction out of the outer handle.

Supplemental Note 17

The method according to Supplemental Notes 1-16, wherein the liner/inner handle while rotating applies, to the stud fixed to the blade, a forward force pushing out the blade so the folding knife is in an open/deployed position.

Supplemental Note 18

The method according to Supplemental Notes 1-17, wherein the liner/inner handle, while rotating forwardly, forms an X-shape with respect to the outer handle before rotating rearwardly back into the outer handle.

Supplemental Note 19

The method according to Supplemental Notes 1-18, the method further including retaining the blade in the closed/undeployed position via applying a magnetic force to the blade and the liner/inner handle.

Supplemental Note 20

A method of operating a folding knife, the folding knife including a blade which includes a stud, and a notch on a top portion of the blade. The folding knife also includes an outer handle including an interior side and a first pivot securing the blade to the outer handle, and the blade is configured to rotate about the first pivot. The folding knife also includes a liner/inner handle configured to rotate about a second pivot forwardly out of the outer handle to engage the stud. The folding knife also includes a detent mechanism configured to releasably retain (i) the blade in a closed/undeployed position and (ii) the liner/inner handle, wherein the liner/inner handle includes a deployment/unlocking tab at a top portion of the liner/inner handle, a lock peg, and the second pivot. The method includes simultaneously applying of pressure on (i) the outer handle, (ii) a mating region/portion, the mating region/portion being formed by the notch and a lock peg of the liner/inner handle, and (iii) a tang of the blade abutting against the second pivot, and the greater the applying of pressure the tighter the locking of the folding knife in an open/deployed position.

The foregoing description of some embodiments of the disclosure has been presented for purposes of illustration and description. The description is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. It should be understood that various changes, substitutions and alterations can be made hereto without departing from the spirit and scope of the disclosure.

What is claimed is:

1. A folding knife, comprising:

a blade comprising:

a stud, and a notch on a top portion of the blade;

an outer handle comprising an interior side and a first pivot securing the blade to the outer handle, the blade configured to rotate about the first pivot;

a liner/inner handle configured to rotate about a second pivot forwardly out of the outer handle to engage the stud; and a detent mechanism configured to releasably retain (i) the blade in a closed/undeployed position and (ii) the liner/inner handle.

2. The folding knife according to claim 1, wherein the liner/inner handle is configured to rotate forwardly by 30 degrees relative to the outer handle out of the outer handle.

3. The folding knife according to claim 1, wherein the liner/inner handle is configured to apply force to the stud of the blade to deploy the blade from the closed/undeployed position to an open/deployed position.

4. The folding knife according to claim 1, wherein the liner/inner handle comprises a deployment/unlocking tab at a top portion of the liner/inner handle, a lock peg, and the second pivot.

5. The folding knife according to claim 4, wherein the lock peg is configured to interface with the notch of the blade in an open/deployed position.

6. The folding knife according to claim 4, wherein the second pivot spans the liner/inner handle and the outer handle.

7. The folding knife according to claim 4, wherein the second pivot is configured to interface with a base portion of the blade in an open/deployed position.

8. The folding knife according to claim 1, wherein the detent mechanism comprises a magnet on the interior side of the outer handle.

9. The folding knife according to claim 8, wherein the liner/inner handle comprises two liners which interface with the magnet, the two liners comprising steel.

10. The folding knife according to claim 8, wherein the magnet comprises two magnets opposing each other which correspondingly interface with two liners of the liner/inner handle.

11. The folding knife according to claim 8, wherein the magnet comprises a side portion, a bottom portion, and a top flat portion.

12. The folding knife according to claim 11, wherein the side portion and the top flat portion interface with the liner/inner handle and the blade, respectively.

13. The folding knife according to claim 11, wherein the bottom portion is fixed to the interior side of the outer handle.

14. The folding knife according to claim 8, wherein the liner/inner handle comprises a cutout accommodating a side portion of the magnet so that the side portion of the magnet is able to have unobstructed magnetic attraction to the liner/inner handle, and a top flat portion of the magnet is able to have unobstructed magnetic attraction with the blade.

15. The folding knife according to claim 14, wherein the cutout is located in a middle region of the liner/inner handle.

16. A method of operating a folding knife, the folding knife comprising:

a blade comprising:

a stud, and a notch on a top portion of the blade;

an outer handle comprising an interior side and a first pivot securing the blade to the outer handle, the blade configured to rotate about the first pivot;

a liner/inner handle configured to rotate about a second pivot forwardly out of the outer handle to engage the stud; and a detent mechanism configured to releasably retain (i) the blade in a closed/undeployed position and (ii) the liner/inner handle, wherein the liner/inner handle comprises a deployment/unlocking tab at a top portion of the liner/inner handle, a lock peg, and the second pivot, and the method comprising applying a downward force to the deployment/unlocking tab rotating the liner/inner handle in a forward direction out of the outer handle.

17. The method according to claim 16, wherein the liner/inner handle while rotating applies, to the stud fixed to the blade, a forward force pushing out the blade so the folding knife is in an open/deployed position.

18. The method according to claim 16, wherein the liner/inner handle, while rotating forwardly, forms an X-shape with respect to the outer handle before rotating rearwardly back into the outer handle.

19. The method according to claim 16, the method further comprising retaining the blade in the closed/undeployed position via applying a magnetic force to the blade and the liner/inner handle.

20. A method of operating a folding knife, the folding knife comprising:

a blade comprising:

a stud, and a notch on a top portion of the blade;

an outer handle comprising an interior side and a first pivot securing the blade to the outer handle, the blade configured to rotate about the first pivot;

a liner/inner handle configured to rotate about a second pivot forwardly out of the outer handle to engage the stud; and a detent mechanism configured to releasably retain (i) the blade in a closed/undeployed position and (ii) the liner/inner handle, wherein the liner/inner handle comprises a deployment/unlocking tab at a top portion of the liner/inner handle, a lock peg, and the second pivot, and the method comprising simultaneously applying of pressure on (i) the outer handle, (ii) a mating region/portion, the mating region/portion being formed by the notch and a lock peg of the liner/inner handle, and (iii) a tang of the blade abutting against the second pivot, and the greater the applying of pressure the tighter the locking of the folding knife in an open/deployed position.

* * * * *